United States Patent [19]

Brown

[11] 4,168,677

[45] Sep. 25, 1979

[54] SANITARY BACKWASHING SYSTEM FOR AUTOMATIC MILKING MACHINES

[76] Inventor: Michael J. Brown, 7817 N. Douty St., Hanford, Calif. 93230

[21] Appl. No.: 898,432

[22] Filed: Apr. 20, 1978

[51] Int. Cl.² .......................... A01J 5/04; B08B 3/00; B08B 9/00
[52] U.S. Cl. .......................... 119/14.18; 134/57 R; 134/166 R; 134/169 R
[58] Field of Search .................. 134/57 R, 58 R, 95, 134/102, 166 R, 166 C, 169 R, 169 C, 171, 178; 119/14.18

[56] References Cited

U.S. PATENT DOCUMENTS

| | | | |
|---|---|---|---|
| 655,200 | 8/1900 | Condron | 134/169 C UX |
| 2,733,667 | 2/1956 | Hill | 134/169 C X |
| 3,310,061 | 3/1967 | Bender | 134/58 C |
| 3,461,845 | 8/1969 | Peterson | 134/166 R X |
| 3,500,839 | 3/1970 | Bender | 134/57 R |
| 3,958,584 | 5/1976 | Jones | 134/166 C X |
| 4,034,713 | 7/1977 | Umbaugh | 119/14.18 X |

*Primary Examiner*—Stanley N. Gilreath
*Attorney, Agent, or Firm*—Huebner & Worrel

[57] ABSTRACT

A sanitary backwashing system for an automatic milking machine having a milking unit and a source of vacuum, the system including a valve having a first port connected to the milking unit and a pair of second ports alternately connected to the first port, one of the second ports being connected to the source of vacuum; and a source of sanitizing fluid under pressure connected to the other of the second ports and the valve having a first position in which the valve connects the milking unit to the source of vacuum while blocking off the other of the second ports and a second position in which the valve connects the milking unit to the source of sanitizing fluid while blocking off the source of vacuum.

8 Claims, 2 Drawing Figures

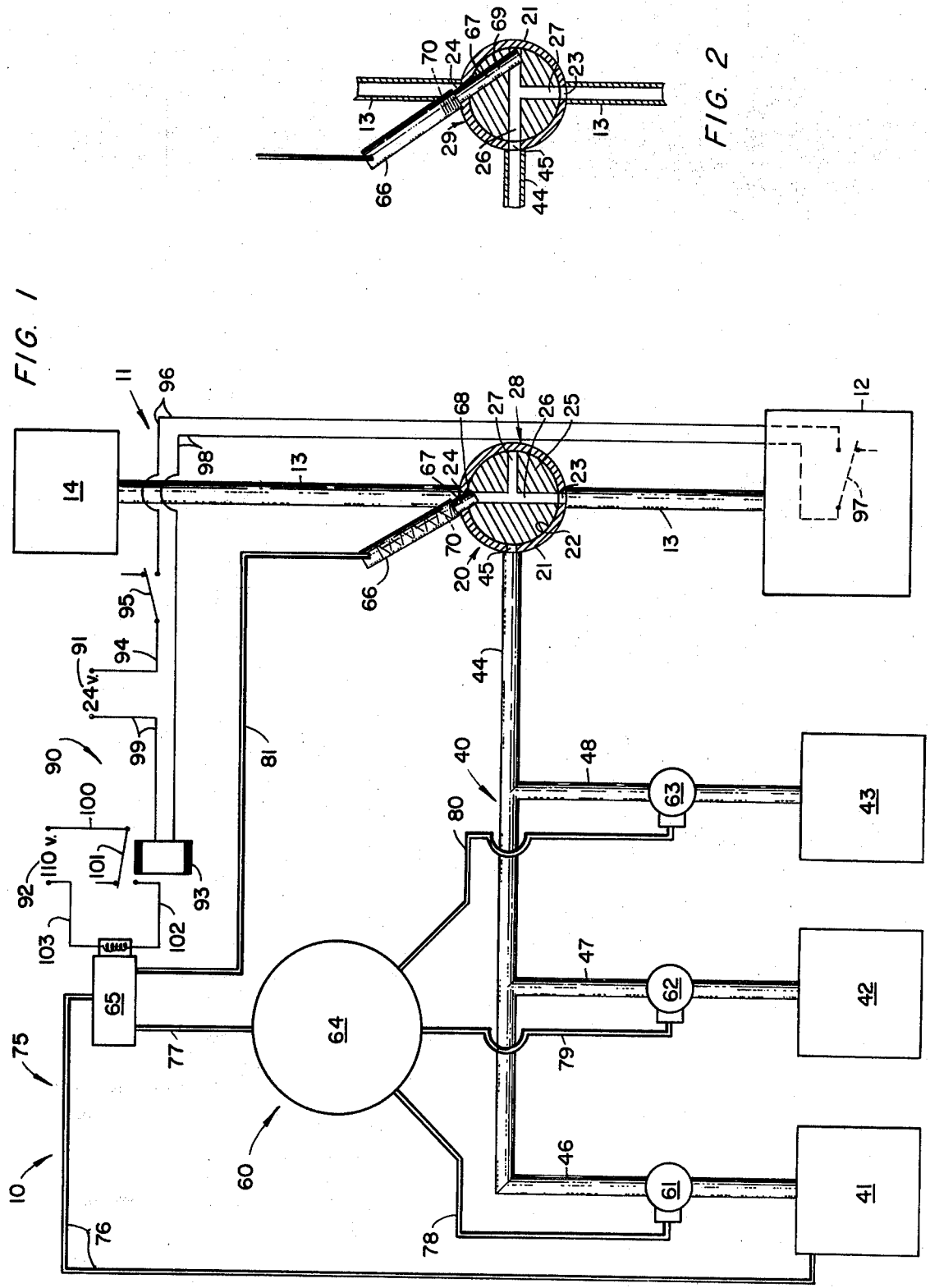

SANITARY BACKWASHING SYSTEM FOR AUTOMATIC MILKING MACHINES

BACKGROUND OF THE INVENTION

1. Field of the Invention

The present invention relates to a sanitary backwashing system for use in conjunction with automatic milking machines and more particularly to such a system which dependably and automatically sanitizes the "claw" or milking unit of the milking machine immediately prior to the milking of each dairy cow without disassembly of the milking machine or other attention.

2. Description of the Prior Art

Primary concerns in the dairy industry involve the prevention of contamination of the milk products and the prevention of disease in dairy herds. Automatic milking and milk processing equipment including milking machines, cream separators, coolers, pasteurizers, homogenizers and the like are constructed of materials and designed so as to minimize the risks of contamination and disease. Frequent disassembly and manual cleaning of such equipment is common required practice in order to maintain a sanitary environment. It is also known periodically to clean dairy equipment by pumping detergents and other cleaning solutions through the equipment.

Notwithstanding this constant attention to cleanliness, mastitis is a condition which has been found particularly difficult to prevent and is a constant impediment to an efficient dairy operation. The condition involves an inflammation of the tissues of the udder and is caused by the *Streptococcus hemolyticus microorganism*. Mastitis can be transferred from cow to cow during milking. One strain of the microorganism is capable of infecting a herd of cattle without causing human sickness. A second strain can cause human epidemics of septic sore throat by injestion of infected milk.

Therefore, it has long been known that it would be desirable to have a system for automatic milking machines which sanitizes milking units prior to milking each cow to preclude contamination and disease, including the transmission of Streptococci microorganisms from one cow to another during milking operations, without requiring the periodic disassembly, sterilization and reassembly of the milking equipment.

SUMMARY OF THE INVENTION

Therefore, it is an object of the present invention to provide a sanitary backwashing system for automatic milking machines.

Another object is to provide such a system which operates to prevent the spread of disease within a dairy herd and which similarly operates to prevent contamination of the milk so as to preclude the transmission of infectious diseases to humans.

Another object is to provide such a system which sanitizes, cleanses and dries the milking equipment immediately after the milking of each dairy cow so that the equipment is free of contamination and disease when milking of the next cow is begun.

Another object is to provide such a system which prevents the inadvertent intermixing of sanitizing and cleaning fluids with the milk by controlling the sequence, timing and direction of fluid flow.

Another object is to provide such a system which operates substantially automatically to perform its various functions in a manner which is fully compatible with milking operations using conventional automatic milking machines and which requires little or no supervision.

Further objects and advantages are to provide improved elements and arrangements thereof in an apparatus for the purposes described which is dependable, economical, durable and fully effective in accomplshing its intended purposes.

BRIEF DESCRIPTION OF THE DRAWING

FIG. 1 is a schematic diagram of the sanitary backwashing system of the present invention.

FIG. 2 is a fragmentary schematic diagram showing the valve of the system disposed in a second operative position.

DESCRIPTION OF THE PREFERRED EMBODIMENT

Referring more particularly to the drawing, the sanitary backwashing system of the present invention is generally indicated by the numeral 10 in FIG. 1. The system is designed to be used in conjunction with and as an operable part of a conventional automatic milking machine indicated at 11 in FIG. 1. The automatic milking machine can be of any suitable type which has a "claw" or milking unit 12 adapted for attachment to the udder of a dairy cow to be milked in the conventional manner. The milking unit is connected by a milk line or conduit 13 to a source of vacuumatic attraction 14.

It will be understood that the automatic milking machine 11 is shown schematically in FIG. 1 for illustrative convenience. Conventional milking machines utilize milking units which have a plurality of cups for attachment to the udder of the cow and which, through the conduit 13, impart an intermittent vacuumatic action to draw milk from the udder of the cow along conduit 13 for collection and subsequent processing.

The sanitary backwashing system 10 includes a three-way control valve 20 which is mounted on the conduit 13, as shown in FIG. 1, between sections of the conduit 13 and thus between the milking unit 12 and the source 14. The control valve has a valve housing 21 defining an interior 22. The housing 21 is connected to the conduit 13 in the direction of the milking unit through a first port 23 which interconnects the conduit with the interior 22 of the housing. The housing is connected to the conduit 13 leading to the source 14 through a second or vacuum port 24 which interconnects the conduit 13 and the interior 22 of the housing. A valve core 25 is disposed within the interior of the valve housing and is movable therewithin. The core has a main passage 26 extending diametrically through the core. A right angle passage 27 extends from the main passage outwardly of the core at substantially right angles to the main passage. The valve core is movable within the valve housing between a first or milking position 28, shown in FIG. 1, in which the main passage interconnects the ports 23 and 24 and the passage 27 is sealed, and a second or cleansing position 29, shown in FIG. 2, in which the passage 27 is connected to the port 23 and port 24 is sealed, as will hereinafter be described.

The backwashing system 10 has a sanitizing system 40 shown in FIG. 1. The sanitizing system includes a source of a drying agent or air under pressure 41, a source of water under pressure 42 and a source of a suitable sanitizing solution under pressure 43. The particular fluid pressures involved may be varied as best suits the equipment and the preferences of the operator. Similarly, any suitable type of sanitizing solution can be employed for the purpose. A sanitation line or main conduit 44 is mounted on the valve housing 21 communicating with the interior 22 thereof through a third or sanitizing port 45. An air conduit 46 interconnects the source of air 41 and the main conduit. A water conduit 47 interconnects the source of water 42 and the main conduit. A sanitizing solution conduit 48 interconnects the source of cleansing fluid or sanitizing solution 43 in the main conduit.

The backwashing system 10 has a pneumatic or control system 60. The control system has an air control valve 61 mounted on the conduit 46 and between the source of air 41 and the main conduit 44. A water control valve 62 is mounted on the water conduit 47 between the source of water 42 and the main conduit. A sanitizing solution control valve 63 is mounted on the conduit 48 between the source 43 and the main conduit. The control valves 61, 62 and 63 are normally closed valves which are independently opened, upon operation of the control system as will hereinafter be described, to permit fluids to flow under pressure from their respective sources along the conduits 46, 47, or 48 into the main conduit 44. The control system 60 has a logic control 64 of any suitable type. Preferably the logic control is a pneumatically operable control valve which possesses a timing mechanism for sequencing of the control system upon operation, as will hereinafter be described. The control system has an electrically operable main air valve 65 which is a normally closed valve. When the main air valve is electrically energized, the valve opens to permit air under pressure to pass therethrough. The control system further includes an air cylinder 66 having a control arm 67 movable between a retracted position 68 shown in FIG. 1 and an extended position 69 shown in FIG. 2. A compression spring 70 is mounted within the cylinder and in engagement with the control arm 67 resiliently to retain the control arm in the retracted position 68. The remote end of the control arm is fastened on the valve core 25 to maintain the valve core in the first position 28 when the arm is in the normal, retracted position 68. Upon energizing of the cylinder, the control arm moves to the extended position to position the valve core in the second position 29.

The control system 60 includes a pneumatic circuit 75. The pneumatic circuit has a pneumatic conduit 76 extending from the source of air under pressure 41 to the main air valve 65 in air supplying relation. A pneumatic conduit 77 operably extends from the air valve 65 to the logic control 64. A pneumatic conduit 78 operably interconnects the logic control 64 and the air control valve 61 of conduit 46. A pneumatic conduit 79 operably extends from the logic control to the water control valve 62 of conduit 47. A pneumatic conduit 80 operably interconnects the logic control 64 and the sanitizing solution control valve 63 of conduit 48. A pneumatic conduit 81 operably extends from the main air valve 65 to the air cylinder 66. Thus, it will be seen that energizing of the main air valve 65 causes air under pressure to flow through conduit 76 from the source of air under pressure 41 through the main air valve 65 to logic control 64 and to the air cylinder 66. This causes the logic control to start the sequence of operations as will hereinafter be described. Similarly, the supply of air under pressure to the air cylinder 66 causes the cylinder to be expanded to move the control arm 67 thereof to the extended position 69.

The sanitary backwashing system 10 has an electrical system generally indicated at 90. The electrical system includes a source of twenty-four volts (24 v.) of electrical energy indicated at 91. A source of one hundred and ten volts (110 v.) of electrical energy is indicated at 92. The electrical system has a relay 93.

The electrical system 90 has an electrical conductor 94 which extends from the source of electricity 91 to a main on-off switch 95. An electrical conductor 96 operably interconnects the on-off switch 95 and a milking unit switch 97 borne by the milking unit 12. The milking unit switch 97 is of an automatic type which is open while the milking unit is attached to the udder of a cow, but which closes upon disconnection of the milking unit from the udder. An electrical conductor 98 operably interconnects the milking unit switch 97 and the relay 93. An electrical conductor 99 operably extends from the relay 93 to the source of electrical energy 91 thus completing this portion of the circuit through the source 91. An electrical conductor 100 extends from the source of electrical energy 92 to a normally open switch 101. The relay 93 and switch 101 are juxtaposed in the conventional manner so that energizing of the relay 93 causes the switch 101 to close. An electrical conductor 102 extends from the normally open switch 101 to the main air valve 65 for energizing thereof. An electrical conductor 103 extends from the main air valve 65 to the source of electrical energy 92 to complete that portion of the circuit.

OPERATION

The operation of the described embodiment of the subject invention is believed to be clearly apparent and is briefly summarized at this point. The automatic milking machine 11 is used in the conventional fashion. This involves attachment of the milking unit 12 to each cow and operation of the machine 11 in the conventional manner. If the main on-off switch 95 is in the "off" position as shown in FIG. 1, the entire system 10 is de-energized so that the control valve 20 is in the first position 28 and the switch 97 is in the open position. This permits use of the automatic milking machine without the sanitary backwashing system having any operative effect or otherwise interferring with normal operation and use of the conventional milking machine.

When, as is normally the case in use of the milking machine 11, the switch 95 is closed or in otherwords, positioned in the "on" position, the backwashing system 10 operates automatically to perform its various functions. Closure of switch 95 permits current to flow through the electrical system 90 to the normally open milking unit switch 97. Since this switch is a normally open switch, current does not pass through the electrical system and the backwashing system 10 thus remains inoperative.

When the milking unit 12 is removed from the cow subsequent to milking the switch 97 automatically closes, as previously described, permitting electrical energy to flow through the electrical system 90 to the relay 93. Energizing of the relay 93 causes switch 101 to be closed. As a result, electrical energy flows through the system from the source of electrical energy 92 through electrical conductors 100, 102 and 103 to energize the main air valve 65.

When the main air valve 65 is energized, air under pressure flows from the source 41 through pneumatic conduit 76, main air valve 65, pneumatic conduit 81 to pressurize the air cylinder 66. Pressurization of the air cylinder causes the cylinder to expand and move the control arm 67 thereof to the extended position 69 shown in FIG. 2. This causes the valve core 25 of the control valve 20 to be moved to the second position 29 shown in FIG. 2. As a result sanitizing port 45 is connected to first port 23 and vacuum port 24 is sealed by the valve core. It will be seen that as long as the main air valve 65 remains energized by closure of the normally open switch 101 the air cylinder and valve core remain in these respective positions.

Simultaneously, the main air valve 65 directs air under pressure through pneumatic conduit 77 to the logic control 64. This begins the sequence of timed operations which results in the backwashing system 10 performing its various sanitizing functions with respect to the milking unit 12. However, upon the initial supply of air thereto, the logic control causes a preset lapse of time of up to seven and one half (7 ½) seconds to transpire before any functions are performed. This lapse of time ensures that the control valve 20 has been disposed in the second position 29 thus sealing the remainder of the milking machine 11 to the right of the control valve and the milk therewithin from the sanitizing operation to be performed. The lapse of time also ensures that the milking unit is separated from the cow before the sanitizing operation begins. The precise length of the lapse of time can, of course, be such as is most appropriate for the milking equipment in use and the preferences of the operator.

When this lapse of time has transpired, the logic control 64 first directs air under pressure along pneumatic conduit 80 to the sanitizing solution control valve 63 causing it to open. The sanitizing solution is thus released under pressure from the source 43 along conduit 48 and into the main conduit 44. The solution passes through the ports 45 and 23 and the passages 26 and 27 of the valve core into the conduit 13. The sanitizing solution is discharged through all of the passages, not shown, of the milking unit to sanitize the entire unit. After a suitable preset period of time, such as five (5) seconds, the logic control shuts off the flow of air along conduit 80 thus resulting in the closure of valve 63 and terminating the flow of sanitizing solution from the source 43.

Subsequently the logic control 64 directs air under pressure along pneumatic conduit 79 to open water control valve 62. Opening of valve 62 causes water under pressure to pass from the source 42 along water conduit 47, into main conduit 44 and through the valve core and conduit 13 into and through the milking unit. The water is forced through the system and the milking unit to rinse all of the sanitizing solution from the system and this operation is continued a suitable period of time for this purpose. Thereafter, the logic control 64 shuts off the flow of air along conduit 79 thus closing valve 62 and terminating the flow of water through the system 10 from the source 42.

The logic control 64 then directs air under pressure along pneumatic conduit 78 to air control valve 61 causing it to open. This permits air under pressure to flow from the source 41 along air conduit 46, into main conduit 44, through the valve core 25 along conduit 13 and through the milking unit 12. This forceful passage of air operates to dry the system 10 and the milking unit thus returning them to a dry, sanitized condition suitable for milking of the next cow. When a suitable preset period of time, such as ten (10) seconds, has elapsed, the logic control 64 terminates the flow of air along pneumatic conduit 78 thus allowing the air control valve 61 to close and terminating the flow of air through the system. This completes the sequence of operations performed by the logic control during one cycle. It will be understood that the time periods heretofore set forth are not critical to the successful operation of the system of the present invention and can be varied to suit the needs of the operator. Similarly, if desired, the logic control 64 can be set to provide a time delay between the closing of control valve 63 and the opening of control valve 62 as well as between the closing of control valve 62 and the opening of control valve 61.

When the milking unit 12 is moved into position and connected to the udder of the next successive cow for milking, the switch 97 is again moved to the open position as previously described. This causes the relay 93 to be de-energized and thus the normally open switch 101 again to move to the open position. This causes the main air valve 65 to be de-energized thus terminating the flow of air to the logic control 64 and to the air cylinder 66. Thus, the air cylinder is de-pressurized. The spring 70 within the air cylinder consequently returns the control arm 67 thereof to the retracted position 68 thus simultaneously moving the valve core 25 to the first position 28 also shown in FIG. 1. As a result, the system 10 is again ready for the next cycle of operation when milking of the cow is completed. Since the switch 97 does not open after one sanitizing cycle until the milking unit is again in place on the udder of a cow, the core 25 of the control valve 20 does not again move to the first position 28 until such attachment has been accomplished. This operates to ensure that the conduit 13 is not open beyond the control valve to the collection point for milk at any time between milking operations. Thus, contamination of the milk by air-borne substances is precluded.

Therefore, the sanitary backwashing system of the present invention is uniquely suited to the sanitizing, washing and drying of the operative portions of automatic milking machines which come into contact or into near contact with dairy cows during the milking; operates automatically to perform its various functions without manual assistance, supervision or disassembly of the milking machine; and precludes contamination of the milk and the spread of disease, such as mastitis, within the herd and in a manner potentially hazardous to humans.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A sanitary backwashing system for an automatic milking machine having a milking unit, a source of vacuum and a milk line interconnecting the milking unit and the source of vacuum, comprising:
   A. a source of sanitizing fluid;
   B. a fluid control valve connected to the source of sanitizing fluid;
   C. a source of air under pressure;
   D. an air control valve connected to the source of air under pressure;

E. a sanitation line interconnecting the fluid control valve and the air control valve in parallel;

F. a three-way valve in the milk line connected to the sanitation line having a first position shutting off the sanitation line while connecting the milking unit to the source of vacuum, and a second position connecting the sanitation line to the milking unit while isolating the milking unit from the source of vacuum; and G. means for successively placing the three-way valve in the first position while closing the fluid control valve and the air control valve, positioning the three-way valve in its second position while opening the fluid control valve to flush sanitizing fluid through the milking unit with the air control valve closed, with the three-way valve in its second position closing the fluid control valve and opening the air control valve to blow sanitizing fluid from the milking unit.

2. The backwashing system of claim 1 including:

H. a source of water; and

I. a water control valve connected to the source of water and to said sanitation line and operable by said placing means to open with the three-way valve in its second position and the fluid and air control valves closed to flush water through the milking unit subsequent to flushing with the sanitizing solution and prior to blowing air therethrough.

3. The backwashing system of claim 1 wherein said placing means includes a logic control operably connected to the fluid and air control valves for discriminately opening and closing said valves in timed sequence to said positioning of the three-way valve in the second position.

4. The backwashing system of claim 1 including:

H. an electrical system having a switch borne by the milking unit which closes only when the milking unit is disconnected from a cow, a source of electrical energy and an electrical circuit interconnecting said source of electrical energy, the switch and the placing means to power the placing means from the source of electrical energy upon disconnection of the milking unit from a cow.

5. A sanitary backwashing system for an automatic milking machine having a milking unit, a source of vacuum and a milk line interconnecting the milking unit and the source of vacuum, comprising:

A. a valve having a first port connected to the milking unit through the milk line, a second port connected to the source of vacuum through the milk line and a third port and a valve member movable between a milking position interconnecting the first and second ports and sealing the third port and a cleansing position interconnecting the first and third ports and sealing the second port;

B. means connected to the third port for supplying a cleansing fluid to the third port; and C. control means operably interconnecting the milking unit and the valve member for maintaining the valve member in the milking position when the milking unit is attached to an animal to be milked and for moving said valve member to the cleansing position upon detachment of the milking unit from an animal thereby sealing the milk line between the valve and the source of vacuum from communication with the milking unit when the milking unit is detached from an animal.

6. The backwashing system of claim 5 wherein the control means delays movement of the valve member to the milking position upon initiation of attachment to an animal to be milked to insure said sealing of the milk line between the valve and the source of vacuum during the attachment process.

7. The backwashing system of claim 5 including means connected to the third port for supplying a drying agent to said third port and wherein the control means is operably connected to the cleansing fluid supplying means and to the drying agent supplying means and is operable upon movement of the valve member to the cleansing position to direct cleansing fluid and drying agent in sequence from their respective supplying means through the valve, along the milk line to the milking unit.

8. The backwashing system of claim 7 wherein the cleansing fluid is a sanitizing solution, the drying agent is air under pressure and the backwashing system includes means connected to the third port for supplying water to the third port and said control means is operably connected to said water supplying means to direct water from the water supplying means to the third port in sequence between said direction of the cleansing fluid and direction of the drying agent.

* * * * *

UNITED STATES PATENT AND TRADEMARK OFFICE
CERTIFICATE OF CORRECTION

PATENT NO. : 4,168,677
DATED : September 25, 1979
INVENTOR(S) : Michael J. Brown It is certified that error appears in the above—identified patent and that said Letters Patent are hereby corrected as shown below:

Column 7, line 35, before "to" insert ---subsequent---.

Signed and Sealed this

Fourth Day of December 1979

[SEAL]

Attest:

SIDNEY A. DIAMOND

Attesting Officer    Commissioner of Patents and Trademarks